(12) United States Patent
Raghothaman et al.

(10) Patent No.: US 8,774,134 B2
(45) Date of Patent: Jul. 8, 2014

(54) ACCESS TERMINAL HAND-OFF METHODS IN WIRELESS NETWORKS

(75) Inventors: Balaji Raghothaman, Hollis, NH (US); Woojune Kim, Arlington, MA (US)

(73) Assignee: Airvana LP, Chelmsford, MA (US)

( * ) Notice: Subject to any disclaimer, the term of this patent is extended or adjusted under 35 U.S.C. 154(b) by 900 days.

(21) Appl. No.: 12/343,438

(22) Filed: Dec. 23, 2008

(65) Prior Publication Data

US 2010/0157941 A1    Jun. 24, 2010

(51) Int. Cl.
*H04W 4/00* (2009.01)

(52) U.S. Cl.
USPC .......... 370/332; 370/401; 455/438; 455/439; 455/440; 455/442

(58) Field of Classification Search
USPC .......... 370/331, 332, 333, 334; 455/436, 437, 455/438, 439, 440, 441, 442, 443, 444
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2002/0080853 A1* | 6/2002 | Zeira et al. | 375/130 |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0274676 A1* | 12/2006 | Niu et al. | 370/255 |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |

(Continued)

OTHER PUBLICATIONS

3rd Generation Partnership Project 2 "3GPP2", "Cellular Radiotelecommunications Intersystem Operations", 3GPP2 N.S0005-0, version 1.0, Jul. 1997 (1492 pages).

(Continued)

*Primary Examiner* — Alvin Zhu
(74) *Attorney, Agent, or Firm* — Fish & Richardson P.C.

(57) ABSTRACT

This description relates to access terminal hand-off methods in wireless networks.

23 Claims, 4 Drawing Sheets

(56) References Cited

U.S. PATENT DOCUMENTS

| | | |
|---|---|---|
| 2007/0155388 A1* | 7/2007 | Petrovic et al. ............... 455/442 |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2009/0047962 A1* | 2/2009 | Rao ............... 455/437 |
| 2010/0130210 A1* | 5/2010 | Tokgoz et al. ............... 455/437 |
| 2010/0157941 A1 | 6/2010 | Raghothaman et al. |

OTHER PUBLICATIONS

"Active Call Hand-in in cdma2000 lx: Airvana, Qualcomm", Oct. 27, 2008, Seoul, Korea, PowerPoint presentation (7 pages).

* cited by examiner

ACCESS TERMINAL HAND-OFF METHODS IN WIRELESS NETWORKS

FIELD

This description relates to access terminal hand-off methods in wireless networks.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs"). Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

SUMMARY

In general, in some aspects, a method includes determining a first pathloss value at a first private access point. The first private access point is one of several private access points in a wireless communication network. The first pathloss value is an estimate of a first pathloss between the first private access point and a first access terminal. In the method, determining the first pathloss value includes determining a first received power value at the first private access point, the first received power value being associated with the first access terminal. The method also includes sending at least one of the first pathloss value or the first received power value to a private access point server. The private access point server is configured to communicate with the several private access points and is configured to determine, using the at least one of the pathloss value or the first received power value, whether the first private access point is most likely of the several private access points to include an unidentified private access point. The unidentified private access point is the subject of a hand-off message sent to the private access point server by a macro access point. The macro access point is in communication with a second access terminal over a connection.

Implementations may include one or more of the following features.

The method may also include, in response to sending the at least one of the first pathloss value or the first received power value, and in response to the private access point server determining that the first private access point is the most likely to include the unidentified private access point, communicating with the second access terminal over the connection. The connection may be handed off from the macro access point to the first private access point.

In the method, the first access terminal may not include the second access terminal and the first private access point may not include the unidentified private access point.

In the method, the first access terminal may include the second access terminal and the first private access point may include the unidentified private access point.

In the method, determining the first received power value may include measuring a first received power at the first private access point from the first access terminal.

In the method, determining the first pathloss value may include determining a first transmit power value at the first private access point. The first transmit power value may be indicative of a first transmit power of the first access terminal. In the method, determining the first transmit power value may include determining the first transmit power value using at least one of a second pathloss value or an equivalent thermal noise level value. The second pathloss value may be an estimate of a second pathloss between the macro access point and the first access terminal. In the method, an estimate of a third pathloss between the macro access point and the first private access point may be used as the second pathloss value. In the method, determining the first pathloss value may also include determining the first pathloss value by dividing the first received power value by the first transmit power value to produce the first pathloss value.

In the method, determining the first received power value may include measuring a first received power at the first private access point from the first access terminal. The method may also include determining a second received power value. The second received power value may be associated with the second access terminal. The method may also include comparing the second received power value with the first received power value. The method may also include, if the second received power value is approximately equal to the first received power value, causing a message to be sent to the macro access point. The message may be configured to direct the macro access point to attempt to handoff the connection to the first private access point. In the method, determining the second received power value and comparing the second received power value with the first received power value may include determining the second received power value at at least one of the private access point server or the first private access point; and comparing the second received power value with the first received power value at at least one of the private access point server or the first private access point. The method may also include receiving a first transmit power value. The first transmit power value may be indicative of a first transmit power of the macro access point. The method may also include receiving a third received power value. The third received power value may be indicative of a third received power received from the second access terminal at the macro access point. The method may also include receiving a first pilot strength measurement value. The first pilot strength measurement value may be indicative of a fourth received power received from the macro access point at the second access terminal. The method may also include receiving a second pilot strength measurement value. The second pilot strength measurement value may be indicative of a fifth received power received from a second private access point at the second access terminal. The method may also include, if the second received power value is approximately equal to the first received power value, determining that the first private access point includes the second private access point. In the method, the first transmit power value, the third received power value, the first pilot strength measurement value, and the second pilot strength measurement value may be sent from the macro access point to the private access point server. In the method, determining the second received power value may include determining the second received power value using at least one of the first transmit power value, the third received power value, the first pilot strength measurement value, the second pilot strength measurement value, or a second transmit power value. The second transmit power may be indicative of a second transmit power of the first private access point. In the method, determining the second received power value may include multiplying the third received power value by a first ratio and a second ratio to produce the second received power value. The first ratio may include the first pilot strength measurement value divided by the second pilot strength measurement value. The second ratio may include the first transmit power value divided by the second transmit power value.

In some aspects, a private access point includes a memory and one or more processing devices. The memory is configured to store instructions for execution. The one or more processing devices are configured to execute the instructions. The instructions are for causing the one or more processing devices to determine a first pathloss value at the private access point. The private access point is one of several private access points in a wireless communication network. The first pathloss value is an estimate of a first pathloss between the first private access point and a first access terminal. In the private access point, determining the first pathloss value includes determining a first received power value at the first private access point. The first received power value is associated with the first access terminal. In the private access point, the instructions are for causing the one or more processing devices to send at least one of the first pathloss value or the first received power value to a private access point server. The private access point server is configured to communicate with the one or more private access points and is configured to determine, using the at least one of the pathloss value or the first received power value, whether the first private access point is most likely of the one or more private access points to include an unidentified private access point. The unidentified private access point is the subject of a handoff message sent to the private access point server by a macro access point. The macro access point is in communication with a second access terminal over a connection.

Implementations may include one or more of the following features.

In the private access point, the instructions may include instructions for causing the one or more processing devices to, in response to sending the at least one of the first pathloss value or the first received power value, and in response to the private access point server determining that the first private access point is the most likely to include the unidentified private access point, communicate with the second access terminal over the connection. The connection may be handed off from the macro access point to the first private access point.

In some aspects, one or more computer-readable media store executable instructions. The one or more computer-readable media are tangible media. The instructions are for causing one or more processing devices to determine a first pathless value at the private access point. The private access point is one of several private access points in a wireless communication network. The first pathloss value is an estimate of a first pathloss between the first private access point and a first access terminal. Determining the first pathloss value includes determining a first received power value at the first private access point. The first received power value is associated with the first access terminal. In the one or more computer-readable media, the instructions are also for causing the one or more processing devices to send at least one of the first pathloss value or the first received power value to a private access point server. The private access point server is configured to communicate with the one or more private access points and is configured to determine, using the at least one of the pathloss value or the first received power value, whether the first private access point is most likely of the one or more private access points to include an unidentified private access point. The unidentified private access point is the subject of a handoff message sent to the private access point server by a macro access point. The macro access point is in communication with a second access terminal over a connection.

Implementations may include one or more of the following features.

In the one or more computer-readable media, the instructions may also include instructions for causing the one or more processing devices to, in response to sending the at least one of the first pathloss value or the first received power value, and in response to the private access point server determining that the first private access point is the most likely to include the unidentified private access point, communicate with the second access terminal over the connection. The connection may be handed off from the macro access point to the first private access point.

In general, in some aspects, a method includes receiving a handoff message from a macro access point at a private access point server. The private access point server is in communication with one or more private access points in a wireless communication network. The macro access point is in communication with a first access terminal over a connection. The macro access point sends the handoff message to the private access point server responsively to the first access terminal sending a first pilot strength measurement value to the macro access point. The first pilot strength measurement value is indicative of a first received power received from an unidentified private access point of the one or more private access points at the first access terminal. The handoff message includes information about the unidentified private access point to assist the private access point server in identifying the unidentified private access point. The method also includes requesting one or more pathloss values from a subset of private access points of the one or more private access points. For each private access point of the subset, a respective pathloss value of the one or more pathloss values is an estimate of a respective pathloss between the private access point and a respective access terminal in a vicinity of the private access point. The method also includes determining, using the one or more pathloss values, a selected private access point of the subset. The selected private access point is the most likely to include the unidentified private access point. The method also includes sending a response to the handoff message that identifies the selected private access point to the macro access point so that the macro access point can attempt to handoff the connection to the selected private access point.

Implementations may include one or more of the following features.

In the method, sending the response to the handoff message may also include sending a response to the handoff message if a first pathloss value of the one or more pathloss values exceeds a threshold. The first pathloss value is associated with the selected private access point.

In the method, the handoff message may include a handoff preparation request. The handoff preparation request includes an IS-41 message. In the method, the IS-41 message may include at least one of a FacDir2 message or a HandoffMeasurement Request2 message.

The foregoing methods may be implemented as one or more computer-readable media storing instructions that are executable on one or more processing devices to implement the methods. The foregoing methods may be implemented by one or more processing devices on one or more computing devices. The foregoing methods may be implemented as a computer program product comprised of instructions that are stored on one or more computer-readable media, and that are executable on one or more processing devices. The foregoing methods may be implemented as an apparatus or system that includes one or more processing devices and memory to store executable instructions to implement the methods.

The details of one or more examples are set forth in the accompanying drawings and the description below. Further features, aspects, and advantages will become apparent from the description, the drawings, and the claims.

DETAILED DESCRIPTION

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs"). Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network. The communications link between an access terminal and an access point may be described in terms of separate directional portions. For example, the link from the access point to the access terminal may be referred to as the forward link (FL), while the link from the access terminal to the access point may be referred to as the reverse link (RL).

While an access terminal is active within a communication session with a first access point, the access terminal may move to within the range of another access point. The access terminal may measure the signal strength of the second access point and forward this information to the first access point. If it is beneficial to do so (e.g., a greater signal strength, a wider variety of capabilities, or a financial advantage is associated with the second access point), the first access point may initiate a "hand-off" of the active communication session between the first access point and the second access point.

Figure 1:
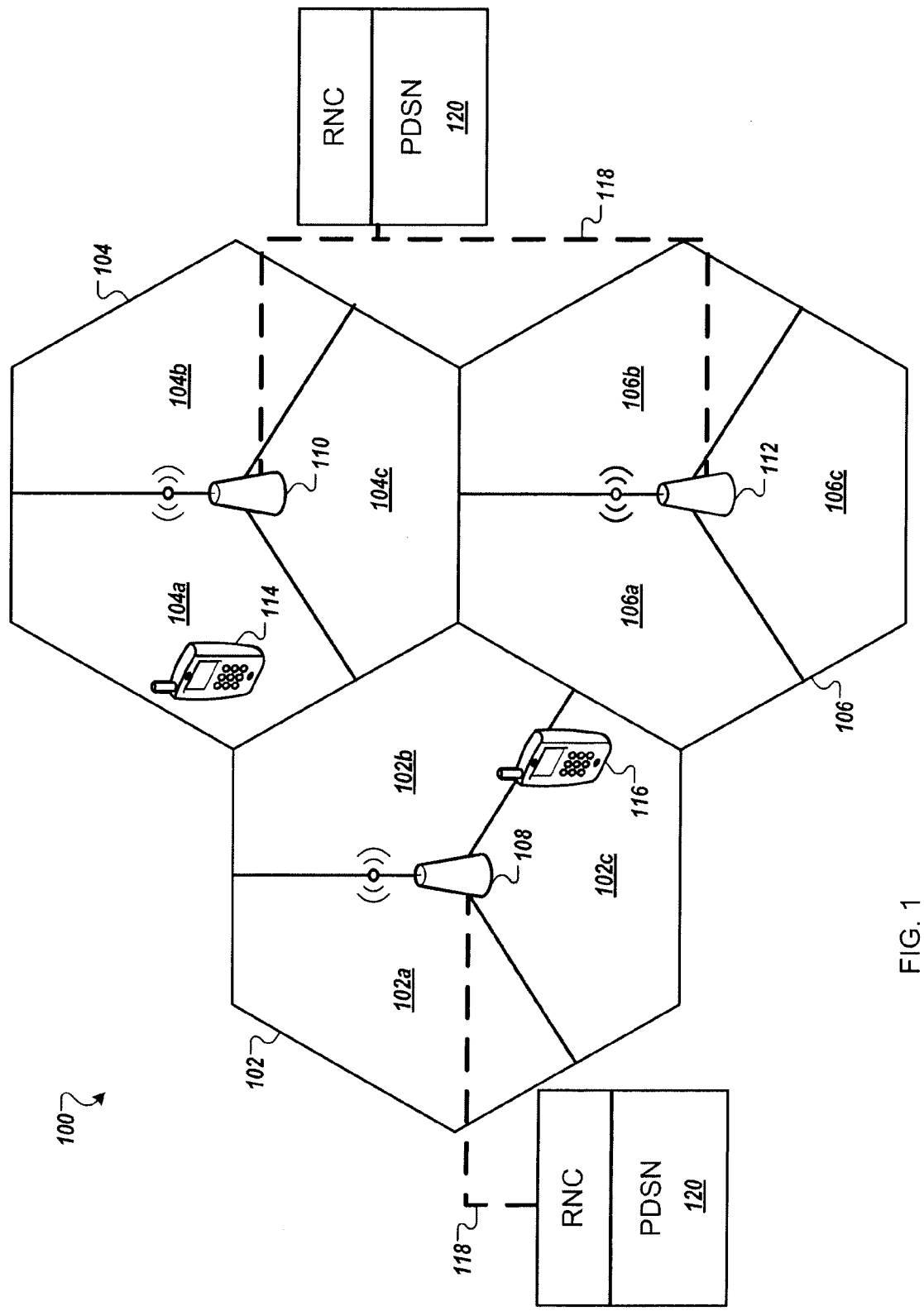
FIG. 1 is a diagram illustrating an example wireless network.

Referring to FIG. 1, a radio access network (RAN) 100 includes multiple macro access points or "macrocells" 108, 110, and 112 located in macrocell areas 102, 104, and 106, respectively. Each macrocell area is often further divided into sectors 102a-c, 104a-c, 106a-c, respectively, by using multiple sectorized antennas at the macrocells. The macrocell areas 102, 104, and 106 may include one or more private access points or "femtocells". The macro access points 108, 110, and 112 are each configured to communicate with an access terminal over an airlink. For example, the macro access point 108 may communicate with access terminal (AT) 116, while the macro access point 110 may communicate with AT 114. The macro access points 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

Figure 2:
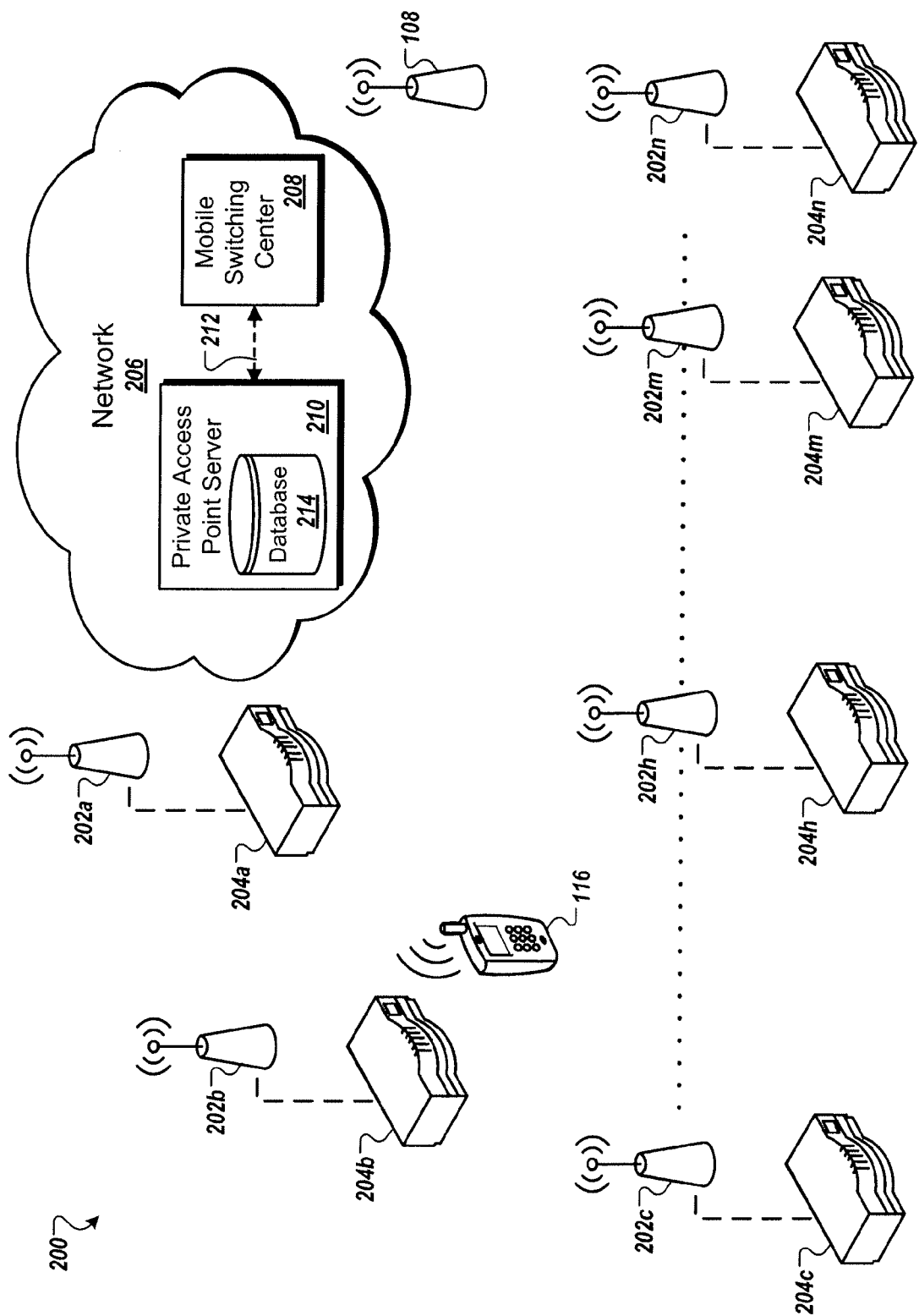
FIG. 2 is a diagram illustrating an example wireless network with several private access points deployed within range of a macro access point.

A radio network access point may be deployed in a home, an office, a public space, or a restaurant in a similar manner as a WiFi® access point. Such a radio network access point is referred to as a private access point. One or more private access points 202, as shown in FIG. 2, may be deployed within the range of the macro access point 108 in a wireless communication network 200. For example, the private access points 202a-n may be arranged within the sector 102c of the cell 102 (as shown in FIG. 1). There may be any number of private access points 202 within the range of the macro access point 108 (e.g., hundreds, thousands, tens of thousands). Each private access point 202 may be identified, in part, by a code space allocation pseudo-noise code (e.g., PN offset value). Each private access point 202a-n may be connected to an available high-speed internet connection, such as a DSL or cable modem 204a-n, as the backhaul with the RNC/PDSN functionality implemented in each private access point 202a-n. The private access points 202a-n may include, for example, femtocells or picocells. In some examples, a private access point may be integrated into a cable modem or other network hardware, such as a router or WiFi access point.

Figure 3:
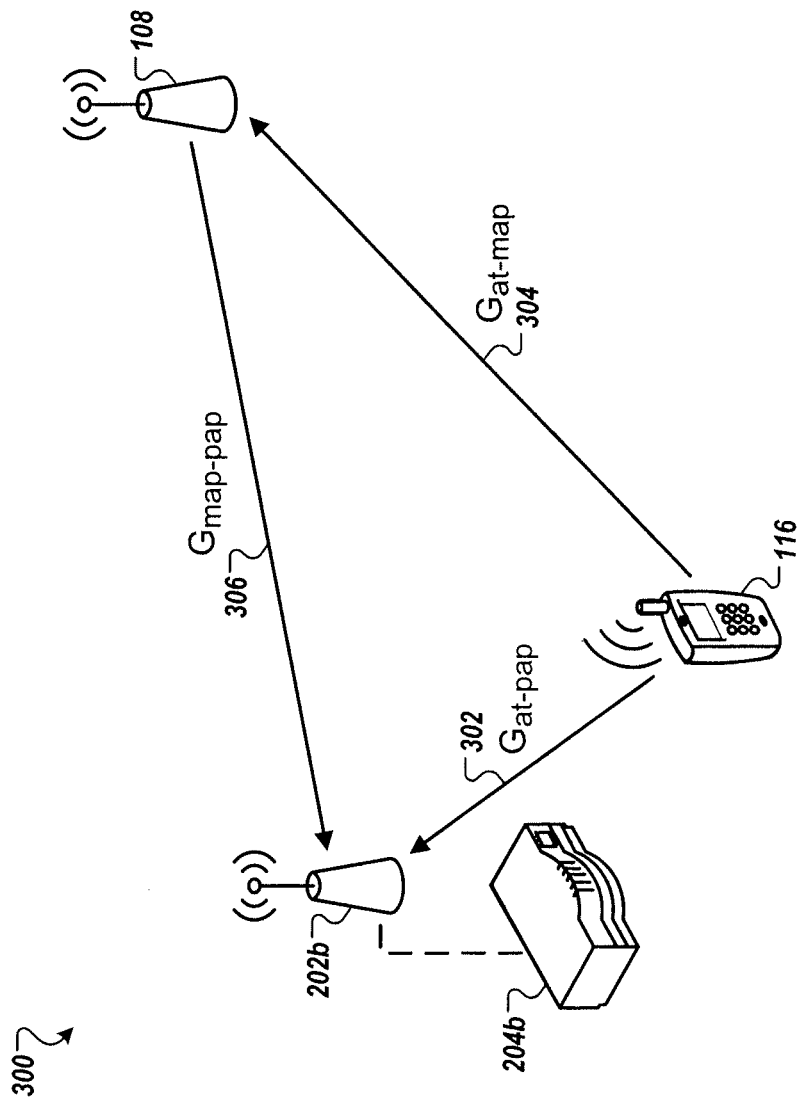
FIG. 3 is a diagram illustrating an example wireless network, including a private access point deployed within range of a macro access point.

The RAN 100 shown in FIG. 1, and the wireless communication networks 200, 300 shown in FIGS. 2-3 may use a 1×RTT protocol and/or an EV-DO protocol to transmit voice and data packets between an access terminal, e.g., access terminals 114, 116, and a radio network access point, e.g., macro access points 108, 110, 112, or private access points 202a-n. Although this description uses terminology from the 1×RTT ("1×") and EV-DO ("DO") air interface standards in CDMA (Code Division Multiple Access) networks, the same concepts are applicable to other communication methods, including UMTS (Universal Mobile Telecommunications Service), GSM (Global System for Mobile Communications), HSDPA (High Speed Downlink Packet Access), WiMax (Worldwide Interoperability for Microwave Access), WiBro (Wireless Broadband), WiFi, and the like.

In some implementations, private access point systems may perform some type of closed access control. Closed access control means, e.g., that access to each private access point is limited in some fashion. For example, not every access terminal may utilize the services of a particular private access point.

In some implementations, the owner of a private access point may choose to control which access terminals are allowed to utilize the services of that private access point. Individual access terminals may be "authorized" or "not authorized" ("unauthorized") to use the services of the private access point. The private access point, for example, may include an authorization list, or "access control list", which may be stored in memory on the private access point. The access control list for a particular private access point may include identification information of any authorized access terminals. Access terminals that are not identified on the access control list of a particular private access point are not authorized on that private access point. A particular access terminal may be authorized on one private access point and unauthorized on another private access point. Just as a private access point may identify more than one authorized access terminal in its access control list, an access terminal may be authorized on more than one private access point.

When an authorized access terminal (e.g., the access terminal 116) is present within range of a private access point (e.g., the private access point 202b), it may use the private access point rather than a regular cellular radio network access point, such as the macro access point 108, to place or receive voice calls and data connections, even if the access terminal is otherwise within the cell region for the cellular radio network access point.

We sometimes refer to the macro access point 108 as a standard access point or macro BTS to distinguish the macro access point 108 from a private access point, as the macro access point 108 provides direct access to a wider core network 206 (e.g., radio access network). For example, the macro access point 108 may provide the access terminal 116 with a communication link to a mobile switching center (MSC) 208 within the network 206. The MSC 208 may coordinate mobility management for active communication sessions (e.g., voice calls, data transfers, etc.) of the access terminal 116. The MSC 208 may also enable the access terminal 116 to establish communication links with other devices and systems (e.g., a Plain Old Telephone System (POTS)) to engage in communication sessions.

A private access point server 210 may provide PN offset assignment storage and other functions such as tracking the location of the private access points 202. In some implementations, the private access point server 210 assigns appropriate PN offsets to each private access point 202, for example based upon the strength of signals (with PN offsets) in the vicinity of the individual private access point 202. For example, a PN offset may be assigned that corresponds to a relatively weak signal (that includes the PN offset) or an offset that is not observed to be associated with any signals in proximity of the individual private access point 202. Along with storing data representing available PN offsets and PN offset assignments, the private access point server 210 may also store other information (e.g., private access point location information, private access point capabilities, etc.).

The private access point server 210, in some implementations, may store one or more pieces of this information within a database 214 for later retrieval. The database 214, for example, may include one or more storage devices designed into the hardware of the private access point server 210 or accessible to the private access point server 210 (e.g., using a direct connection or a remote connection through the network 206).

The private access point server 210 and the MSC 208 are connected by a network communication link 212. The network communication link 212 may be a wired or wireless communication path. In some examples, the MSC 208 and the private access point server 210 may be co-located within the same room or integrated within the same piece of equipment.

When the access terminal 116 approaches the private access point 202b, for example, the access terminal 116 may detect a transmission from the private access point 202b broadcasting the availability of the private access point 202b. This broadcast may include, for example, a PN offset assigned to the private access point 202b. While the access terminal 116 is in communication (e.g., active or idle) with the macro access point 108, the access terminal 116 may send a message to the macro access point 108, including information regarding the detected private access point 202b, to request a handoff to the detected private access point 202b. The message, for example, may be a pilot strength measurement message (PSMM) as defined in the 1×RTT system protocol. The information contained within the message may include, for example, a scrambling code (e.g., a private long code mask (PLCM) or other reverse link long code) identifying the access terminal 116, a PN offset value identifying the private access point 206b, a signal strength measurement, and a communication frequency associated with the private access point 202b. The communication frequency, in some examples, is the operating frequency of the private access point 202b. The communication frequency observed by the access terminal 116 may instead be the beacon frequency of the private access point 202b. For example, the private access point 202b may intermittently switch to one or more beacon frequencies to transmit its availability to access terminals which may be communicating at a different frequency than the operating frequency of the private access point 202b.

In a first example, a handoff request may be requested based upon a private access point broadcasting a hand-in assist (HA) beacon. In some implementations, each private access point 202 may broadcast an HA beacon which advertises the availability of the private access point 202 to any access terminals in the area. For example, a reserved PN offset value (e.g., a hand-in assist PN or $PN_{HA}$) may be assigned to each frequency, and used by all access points transmitting the beacon in that frequency. A single $PN_{HA}$ could be used for all frequencies (e.g., potential operating frequencies of the access terminals), or a different $PN_{HA}$ may be broadcast depending upon the set beacon frequency.

In some implementations, the HA beacon may be broadcast constantly. In other implementations, the HA beacon may be broadcast based upon a trigger. For example, the private access point 202b may broadcast the HA beacon periodically (e.g., every 10 seconds, every 1 minute, etc.).

The macro access point 108 may be aware of the values for all $PN_{HA}$ offsets broadcast in the region of the cell 102 rather than the individual PN offsets of the private access points 202. The macro access point 108 may provide the $PN_{HA}$ offset(s) of the neighboring private access points 202 to the access terminal 116.

When the access terminal 116 detects and reports the $PN_{HA}$ offset to the macro access point 108, the macro access point 108 may initiate a hand-off.

In some implementations, the private access point 202b may broadcast the HA beacon upon detection of an authorized access terminal within proximity of the private access point 202b. For example, the access terminal 116 may only be authorized to communicate with a subset of the private access points 202. The private access point 202b may have a list of authorized access terminals. The private access point 202b, for example, may listen for the scrambling code values associated with all authorized access terminals. When the private access point 202b detects that an authorized access terminal (e.g., the access terminal 116) is within proximity, the private access point 202b may trigger the HA beacon. In addition to triggering the HA beacon, the private access point 202b may inform the private access point server 210 that the HA beacon has been activated due to the identification of the access terminal 116 (e.g., as identified by the scrambling code of the access terminal 116). The private access point server 210 may store this information.

The access terminal 116 may recognize the HA beacon from the private access point 202b and report the $PN_{HA}$ of the access point 202b to the macro access point 108. The macro access point 108 may send an American National Standards Institute (ANSI) interim standard IS-41 message such as a FacilitiesDirective2 (FacDir2) message to the private access point server 210 via the MSC 208 for initiating a handoff. The FacDir2 operation provides a mechanism for coordinating the handoff of a communication session to a target system, as defined by the 3rd Generation Partnership Project 2 (3GPP2) standard regarding Cellular Radiotelecommunications Intersystem Operations (e.g., publication N.S0005-0 v1.0, section 4.2.1), incorporated herein by reference. The FacDir2 message may, for example, include the $PN_{HA}$ offset and the HA beacon frequency reported by the access terminal 116 along with the scrambling code of the access terminal 116.

The private access point server 210 may recognize the $PN_{HA}$ offset and the HA beacon frequency as the values previously reported by the private access point 202b in relation to the detection of the access terminal 116. In this way, the private access point server 210 may positively identify the private access point 202b as the subject of the FacDir2 message from the macro access point 108.

The private access point server 210 may respond to the macro access point 108 by accepting the handoff. The FacDir2 response may, for example, include the operating frequency and PN offset of the private access point 202b. The macro access point 108 may then send a universal handoff direction message (UHDM), containing the operation frequency and PN offset of the private access point 202b, to the access terminal 116.

The private access point server 210 may be aware of the private access points 202 neighboring the macro access point 108 and the PN offset value assigned to each. However, due to reuse of PN offset values, the private access point server 210 may not be able to uniquely identify which private access point 202 a handoff request message refers to based upon the contents of the message (e.g., the PN offset and the operating frequency). In some examples, hundreds of private access points 202 may be within the range of the macro access point 108, the private access points 202 sharing a limited number (e.g., 10) of PN offset values.

In a second example of handoff request, the access terminal requests a handoff to an unidentified private access point. If the PN offset of the private access point 202b, for example, is the same as the PN offset of the private access point 202h and the private access point 202m, and the access terminal 116 is authorized to communicate with all three of the private access points 202b, 202h, and 202m, the private access point server 210 may take measures to positively identify which private access point 202 is in proximity to the access terminal 116.

The private access point server 210 may coordinate a proximity estimation between the private access points 202b, 202h, and 202m and the access terminal 116 to determine which private access point 202 is nearest to the access terminal 116. Once the unidentified private access point 202 has been identified, the handoff of the access terminal 116 to the private access point 202 may proceed with an increased chance of success.

The proximity of the access terminal 116 to the private access point 202b, for example, may be estimated in part by measuring the reverse link signal strength between the private access point 202b and the access terminal 116. For example, if provided with the scrambling code (e.g., reverse link long code) of the access terminal 116 and the broadcasting frequency of the access terminal 116, the private access point 202b may measure the received power value (e.g., the reverse link signal strength) from the access terminal 116. If the access terminal 116 has a PLCM derived from the mobile identification number of the access terminal 116 (e.g., an international mobile subscriber identity (IMSI) or other electronic serial number), the private access point 202b may compute the PLCM of the access terminal 116. If, in some examples, the access terminal 116 is installed with voice privacy mask (VPM), or the access point in communication with the access terminal 116 (e.g., the macro access point 108) assigns the PLCM to the access terminal 116 (e.g., that may or may not be tied to the IMSI of the access terminal), the PLCM may be communicated to the private access point 202b from the private access point server 210.

In some implementations, the private access point 202b may tune its reverse link receiver away from the operating frequency of the private access point 202b to the operating frequency of the access terminal 116 to detect the reverse link signal strength of the access terminal 116. This depends on whether or not the access terminal 116 is operating at the same frequency as the private access point 202b. While the reverse link receiver of the private access point 202b is tuned to the operating frequency of the access terminal 116, for example, the private access point 202b may experience packet loss due to traffic from other access terminals in active communication with the private access point 202b. In other implementations, the private access point 202b may have a dedicated receiver available to tune to another frequency.

The private access points 202b, 202h, and 202m may communicate the reverse link signal strength back to the private access point server 210. The private access point server 210 may compare the reverse link signal strengths of the private access points 202b, 202h, and 202m in an effort to try to determine which private access point is in closest proximity to the access terminal 116.

However, the received power as detected by the private access points 202b, 202h, 202m is generally dependent upon the broadcasting power of the access terminal 116. For example, the access terminal 116 may establish a power level necessary for communication with the macro access point 108. This power level may be greater than needed to communicate with the private access point 202b. In some implementations, the access terminal 116 may be capable of receiving the broadcast message from the private access point 202b even though it is out of the standard access range of the private access point 202b because the access terminal 116 is overpowered. The range of potential power levels may present challenges for the private access point server 210 to set a threshold value for determining whether or not the access terminal 116 is within proximity of the broadcasting range of the private access point 202b, and the resulting estimate may not be very accurate.

Additional factors may be taken into consideration to increase and improve the accuracy of the proximity estimate by basing the estimate upon the pathloss between the access terminal 116 and the private access point 202b. Pathloss may be used to indicate the coverage area of a private access point. The coverage area of the private access point 202b may differ by many meters depending upon the direction of reference. For example, if there is open area to the north of the private access point 202b and a brick wall to the south of the private access point 202b, the effective range in meters of the private access point 202b is far greater to the north than to the south. The private access point 202b, for example, may have an operational range of 80 dB. If the pathloss between the access terminal 116 and the private access point 202b is estimated to be greater than 80 dB, then the access terminal 116 is not considered to be within range of the private access point 202b. Example pathloss estimation algorithms are described below with reference to FIG. 3.

In one example, the macro access point 108 may receive a PSMM from the access terminal 116 indicating a nearby private access point (e.g., the private access point 202b). In response, the macro access point 108 may issue a handoff request to the private access point server 210 (e.g., via the MSC 208), providing the identification of the access terminal 116, the PN offset of the private access point 202b, and the operating frequency of the private access point 202b. To coordinate the proximity estimation measurements, the private access point server 210 may initiate the following sequences of messaging.

In some implementations, the macro access point 108 may issue an IS-41 message such as a FacDir2 message to the private access point server 210 via the MSC 208 for initiating a handoff of the communication session from the macro access point 108 to an unidentified private access point (e.g., identified only by a PN offset and a frequency). The FacDir2 message contains provisions to send the mobile identification number (e.g., IMSI) and the long code number (e.g., PLCM) of the access terminal 116, plus information identifying the target private access point (e.g., a PN offset and a frequency).

In other implementations, the macro access point 108 may issue another IS-41 message such as a HandoffMeasurementRequest2 (HandMReq2) message, as defined by the aforementioned 3GPP2 standard (e.g., publication N.S0005-0 v1.0, section 4.7 incorporated herein by reference), to request a signal quality measurement on a specified channel of the private access point 202b. Using the HandMReq2 message, the macro access point 108 may provide the MSC 208 with the long code number, mobile identification number, and operating frequency of the access terminal 116, along with information identifying the target private access point (e.g., a PN offset and a frequency). The MSC 208 forwards the message to the private access point server 210.

Upon receipt of the handoff request message, the private access point server 210 may access the list of private access points 202 which the access terminal 116 is authorized to use. If the access terminal 116 is a private access terminal (e.g., the access terminal 116 is only authorized to communicate with select private access points 202), the private access point server 210 may verify that the access terminal 116 is authorized to communicate with a private access point 202 which is broadcasting the requested PN offset. If no authorized private access points 202 are assigned the requested PN offset, the private access point server 210 rejects the handoff request.

If one or more authorized private access points 202 are assigned the requested PN offset number, the private access point server 210 may issue a measurement request message to each private access point 202 which is potentially the unidentified private access point 202 indicated by the access terminal 116 within the PSMM message (e.g., the private access points 202b, 202h, and 202m). Each private access point 202b, 202h, 202m may, in turn, perform a proximity detection estimation based upon the reverse link signal strength of the access terminal 116 or one of the pathloss estimation algorithms described below with reference to FIG. 3.

Once all of the private access points 202b, 202h, and 202m have responded with proximity estimations, the private access point server 210 may select the nearest private access point 202 to the access terminal 116. The private access point server 210 may also determine whether the proximity estimation provided by the closest private access point 202 meets a threshold for a executing a hand-off operation. For example, depending upon the power setting of the access terminal 116, the access terminal 116 may not be within communication range of any of the private access points 202b, 202h, 202m. If the identified private access point 202 (e.g., the private access point 202b) meets or exceeds the proximity threshold, the private access point server 210 may validate the handoff request (e.g., within the server's 210 response to the IS-41 (e.g., HandMReq2 or FacDir2) message).

If the macro access point 108 initiated the handoff request using the HandMReq2 message, the private access point server 210 may respond to the macro access point 108 with the signal strength provided by the identified private access point 202 (e.g., the private access point 202b).

In some implementations, the private access point server 210 may respond to the HandMReq2 message with a signal strength determined to be within an acceptable range for the MSC 208. For example, the MSC 208 or the macro access point 108 may have threshold values for responses to the HandMReq2 operation based upon the capabilities and signal strengths of macro access points rather than private access points. The private access point server 210 may return a large signal strength value rather than the signal strength measurement provided by the private access point 202b, for example, to increase the probability of the completion of the handoff request.

If a HandMReq2 message was initially issued by the macro access point 108, the macro access point 108 follows the response to the HandMReq2 message with a FacDir2 message. For example, the private access point server 210, in response to the FacDir2 message, may identify the private access point 202b as described above.

The access terminal 116 may have detected the $PN_{HA}$ offset or the beacon frequency of the private access point 202b rather than the operational PN offset or the operational frequency of the private access point 202b and included this information within the initial PSMM message to the macro access point 108, initiating the handoff request. The private access point server 210, within the FacDir2 response message, may substitute the operating PN offset and operating frequency of the private access point 202b for the $PN_{HA}$ offset or the beacon frequency detected by the access terminal 116.

In a third example of handoff request between an access terminal and a private access point, the private access point 202b may first receive a message from the macro access point 108 informing the private access point 202b of the identification of a neighboring access terminal which may be authorized to communicate with the private access point 202b. For example, the macro access point 108 may issue a HandMReq2 message, including the PLCM associated with the access terminal 116, to the private access point 202b or the private access point server 210. The private access point 202b may then listen for the PLCM of the access terminal 116. When the private access point 202b detects the access terminal 116 within proximity, the private access point 202b may trigger the HA assist beacon. The handoff may then ensue between the known private access point 202b (e.g., due to information regarding the HA assist beacon received by the private access point server 210) and the access terminal 116 as described above within the first (e.g., hand-in beacon assisted) handoff method.

FIG. 3 is a diagram illustrating a wireless communication network 300 in which the macro access point 108, the private access point 202b, and the access terminal 116 are arranged to illustrate an access terminal 116 to private access point 202b (at-pap) signal path 302, an access terminal 116 to macro access point 108 (at-map) signal path 304, and a macro access point 108 to private access point 202b (map-pap) signal path 306. The at-pap signal path 302 may be associated with a pathloss value (e.g., a pathloss value or estimate) $G_{at-pap}$. Similarly, the at-map signal path 304 may be associated with a pathloss value $G_{at-map}$ and the map-pap signal path 306 may be associated with a pathloss value $G_{map-pap}$. The pathloss value $G_{at-pap}$ may indicate the relative proximity (e.g., within the coverage area) of the access terminal 116 to the private access point 202b.

Pathloss estimation algorithms may be used to estimate the proximity of an access terminal to a private access point. Generally, e.g., a pathloss over a signal path between two communicating entities is the inverse of the path gain over the signal path between the entities, and vice versa. In some implementations, a pathloss value may include, e.g., an estimate or measurement of a pathloss. In some implementation, a pathloss value may be determined from, or may include, e.g., an estimate or measurement of a path gain.

To estimate the value of the pathloss value $G_{at\text{-}pap}$, the private access point 202b or the private access point server 210 may compute the following example algorithm. First, the private access point 202b may calculate the reverse link signal strength measurement (e.g., received power value) of the access terminal 116 as seen at the private access point 202b. The reverse link signal strength measurement may be represented by the following equation:

$$A = P_{at} G_{at\text{-}pap}$$

Where $P_{at}$ refers to the reverse link operating pilot power of the access terminal 116. For example, because the broadcasting range of a private access point is generally much smaller than the broadcasting range of a macro access point, both the access terminal 116 and the private access point 202b may be considered to be an approximately equal distance away from the macro access point 108.

It may be estimated that the $G_{at\text{-}map}$ is approximately the same as the $G_{map\text{-}pap}$, stated by the following equation:

$$G_{at\text{-}map} \approx G_{map\text{-}pap}$$

The estimate may be made that the received power from the access terminal 116 as measured by the macro access point 108 is approximately equivalent to an equivalent thermal noise level, e.g., the ratio of the thermal noise level $N_0$ to the macro access point design parameter K (e.g., based upon the signal-to-noise ratio (SNR) of the pilot of the access terminal 116) as described by the following equation:

$$P_{at} G_{at\text{-}map} \approx \frac{N_0}{K}$$

The ratio of $N_0$ to K, for example, is commonly designed within a known narrow range such that the received power from an access terminal as measured at the macro access point 108 is approximately the same for all access terminals in communication with the macro access point 108. For example, the macro access point 108 may control the operating power of each access terminal in communication with the macro access point 108 to achieve a common reverse link signal strength across all access terminals.

The SNR of the pilot, in some implementations, may be provided to the private access point server 210 by the MSC 208. The private access point server 210 may store the SNR of the pilot in the database 214 and provide the value to the private access point 202b (e.g., as part of the handoff request process).

Using the above equations the pathloss value $G_{at\text{-}pap}$ may be estimated using the following algorithm:

$$G_{at\text{-}pap} \approx A * G_{map\text{-}pap} \div \frac{N_0}{K}$$

The estimate of the reverse signal pathloss between the access terminal 116 and the private access point 202b (e.g., $G_{at\text{-}pap}$) may be used to determine whether the access terminal 116 is within proximity of the operating range of the private access point 202b.

Other varieties of pathloss estimation algorithms may be used to estimate the proximity of an access terminal to a private access point. For example, in other implementations, to improve the accuracy of the estimate, the macro access point 108 may provide additional data to the private access point server 210 or the private access points 202b, 202h, and 202m. The additional data may include, for example, the transmit power of the macro access point 108 (e.g., $P_m$), the received signal strength from the access terminal 116 as perceived by the macro access point 108, and both the macro access point-side PSMM (e.g., $PSMM_{map}$) and the private access point-side PSMM (e.g., $PSMM_{pap}$) as reported by the access terminal 116. The two PSMM values, for example, may be received by the macro access point 108 from the access terminal 116 through a route update request.

In some implementations, the MSC 208 may include a database in which one or more of these values are stored. For example, the MSC 208 may provide the private access point server 210 with the transmit power of the macro access point 108.

In some implementations, the macro access point 108 provides, in part, a combination value to the private access point server 210, the combination value being a combination of two or more of the $P_{map}$, the $PSMM_{map}$, the $PSMM_{pap}$, or the signal strength of the access terminal 116 as perceived by the macro access point 108.

The private access point server 210, in some implementations, may store one or more pieces of this information regarding the macro access point 108 within the database 214 for later retrieval. For example, the private access point server 210 may already contain information regarding the transmit power or the directional position of the macro access point 108.

Using this additional data, the private access point server 210 may compute an estimate of the received power value between the private access point 202b and the access terminal 116 based upon multiplying the ratio of the transmit power levels of the macro access point 108 and the private access point by the ratio of the PSMM values. For example, the equation for the pathloss from the access terminal 116 to the macro access point 108 as measured by the macro access point 108 may be described by the following equation:

$$B = P_{at} G_{map\text{-}at}$$

The $PSMM_{map}$ may be described by the following equation:

$$PSMM_{map} = P_{map} G_{map\text{-}at} / I_o$$

where $P_{map}$ is the transmit power of the macro access point 108 and $I_o$ is the total received signal at the access terminal 116 (e.g., the signal-to-noise ratio at the access terminal 116). The value of $I_o$ may be determined as the sum of the thermal noise $N_0$ plus the received powers from all access terminals in the operating range of the macro access point 108, regardless of whether these access terminals are communicating with the macro access point 108 or not.

Similarly, the private access point PSMM may be described by the following equation:

$$PSMM_{pap} = P_{pap} G_{pap\text{-}at} / I_o$$

In combining the above equations, the private access point server 210 may compute the following estimation of the received signal strength from the access terminal 116 as experienced at the private access point 202b:

$$\hat{A} = B * (PSMM_{pap} / PSMM_{map}) * (P_{map} / P_{pap})$$

where $P_{pap}$ is the operating power of the private access point 202b. The value $P_{pap}$ may be a known quantity, for example set by the private access point server 210, which the private access point server 210 stores within the database 214.

Alternatively, the private access point 202b may provide the private access point server 210 with the value $P_{pap}$.

In some implementations, the MSC 208 or the macro access point 108 provides the value $B*(PSMM_{pap}/PSMM_{map})$ and, optionally, the value $P_{map}$ to the private access point server 210. The private access point server 210 may use this information to complete the computation of Â by multiplying the provided computation by the ratios of the operating powers of the macro access point 108 and the private access point 202b.

In some implementations, the private access point server 210 computes the value of Â and compares Â to the computed values of A (e.g., as described above) provided by each private access point 202b, 202h, and 202m. If, for example, the value A computed by the private access point 202b is equivalent to the value Â within a reasonable tolerance, it may be concluded that the unidentified private access point 202 the access terminal 116 refers to in the handoff request message is the private access point 202b.

A proprietary interface between the private access points 202 and the macro access point 108, for example, may allow the transmission of data measurements from the macro access point 108. Such data measurements may increase and improve the accuracy of the proximity estimates.

Figure 4:
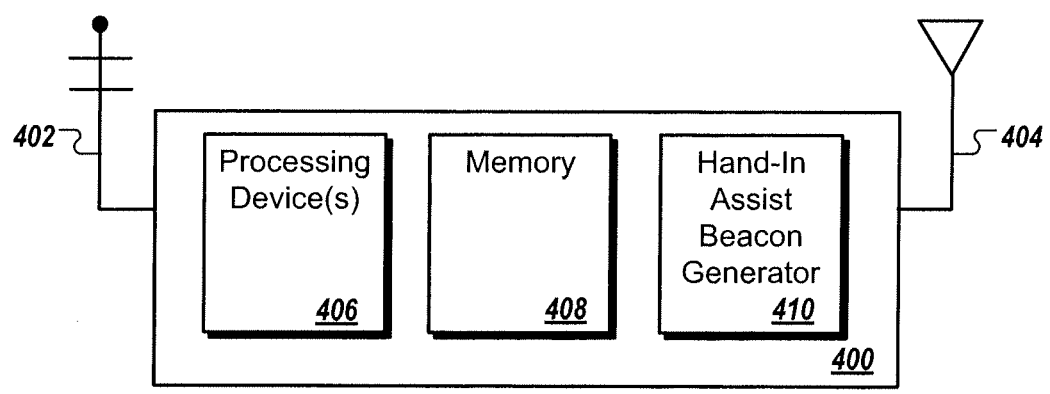
FIG. 4 is a block diagram illustrating an example private access point.

FIG. 4 is a block diagram illustrating an example implementation 400 of a private access point such as, e.g., the private access points 202a-n of FIG. 2. The private access point 400 includes a transmitter 402, a receiver 404, one or more processing devices 406, and a memory 408. The private access point 400 may transmit radio communications using the transmitter 402 (e.g., to send information to an access terminal or other network device) and receive communications using the receiver 404 (e.g., to receive information from an access terminal or other network device). The transmitter 402 and/or the receiver 404 may be tuned to an operating frequency of the private access point 400. The communications transmitted and received by the private access point 400, for example, may be processed using the processing device(s) 406. Information such as system settings (e.g., power setting, operating frequency, identification code(s), etc.), a list of access terminals authorized to communicate with the private access point 400, and/or identification information regarding access terminals being served by the private access point 400, for example, may be stored within the memory 408.

In some implementations, the private access point 400 may include a hand-in assist (HA) beacon generator 410. The HA beacon generator 410, for example, may coordinate the welcoming of access terminals by broadcasting an HA beacon via the transmitter 402 (e.g., as described in relation to FIG. 2). In some implementations, the HA beacon generator 410 may be triggered by one of the processing devices 406, for example in response to recognizing a communication from an authorized access terminal (e.g., an access terminal whose identification code is stored within the memory 408). In other implementations, the private access point 400 may not broadcast an HA beacon and thus does not include the beacon generator 410.

Although the techniques described above employ, e.g., the 1×RTT air interface standard, the techniques are also applicable to other CDMA and non-CDMA air interface technologies in which, e.g., messages may be passed between access terminals and other network components.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

The processes described herein and their various modifications (hereinafter "the processes"), are not limited to the hardware and software described above. All or part of the processes can be implemented, at least in part, via a computer program product, e.g., a computer program tangibly embodied in an information carrier, such as one or more computer-readable storage media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processing devices executing one or more computer programs to perform the functions of the processes. All or part of the processes can be implemented as, special purpose logic circuitry, e.g., an FPGA (field programmable gate array) and/or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. The components of a computer include one or more processing devices for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such actions can be omitted to achieve the same, or similar, results to those described herein.

Components of different implementations may be combined to form implementations not specifically set forth above. Other implementations not specifically described are also within the scope of the following claims.

What is claimed is:

1. A method, comprising:
transmitting a beacon, by a first private access point, the beacon transmitted using a first pseudo-noise code, the first pseudo-noise code being different from an operating pseudo-noise code of the first private access point;
determining a first pathloss value at the first private access point, the first private access point in a wireless communication network, the first pathloss value being an estimate of a first pathloss between the first private access point and a first access terminal, wherein determining the first pathloss value comprises determining a first received power value at the first private access point, the first received power value being associated with the first access terminal;
sending at least one of the first pathloss value or the first received power value to a private access point server, the private access point server being configured to:
receive a hand off message from a macro access point, the hand off message including the first pseudo-noise code corresponding to several private access points including the first private access point, the macro access point being in communication with a second access terminal over a connection;
communicate with the several-private access points;
determine, using the at least one of the first pathloss value or the first received power value, whether the first private access point is most likely of the several private access points to be a subject of the handoff message;
determine, based on at least one of the first pathloss value or the first received power value, whether the first access terminal is within communication range of the first private access point; and
respond to the hand off message substituting the operating pseudo-noise code for the first pseudo-noise code.

2. The method of claim 1, further comprising:
in response to sending the at least one of the first pathloss value or the first received power value, and in response to the private access point server determining that the first private access point is the most likely to be the subject of the handoff message, communicating with the second access terminal over the connection, the connection being handed off from the macro access point to the first private access point.

3. The method of claim 1, wherein the first access terminal does not comprise the second access terminal.

4. The method of claim 1, wherein the first access terminal comprises the second access terminal.

5. The method of claim 2, wherein determining the first received power value comprises:
measuring a first received power at the first private access point from the first access terminal.

6. The method of claim 2, wherein determining the first pathloss value comprises:
determining a first transmit power value at the first private access point, the first transmit power value being indicative of a first transmit power of the first access terminal.

7. The method of claim 6, wherein determining the first transmit power value comprises:
determining the first transmit power value using at least one of a second pathloss value or an equivalent thermal noise level value, the second pathloss value being an estimate of a second pathloss between the macro access point and the first access terminal.

8. The method of claim 7, wherein an estimate of a third pathloss between the macro access point and the first private access point is used as the second pathloss value.

9. The method of claim 8, wherein determining the first pathloss value further comprises:
determining the first pathloss value by dividing the first received power value by the first transmit power value to produce the first pathloss value.

10. The method of claim 5, further comprising:
determining a second received power value, the second received power value being associated with the second access terminal;
comparing the second received power value with the first received power value; and if the second received power value is equal to the first received power value, causing a message to be sent to the macro access point, the message being configured to direct the macro access point to attempt to handoff the connection to the first private access point.

11. The method of claim 10, wherein determining the second received power value and comparing the second received power value with the first received power value comprise:
determining the second received power value at at least one of the private access point server or the first private access point; and
comparing the second received power value with the first received power value at at least one of the private access point server or the first private access point.

12. The method of claim 10, further comprising:
receiving a first transmit power value, the first transmit power value being indicative of a first transmit power of the macro access point;
receiving a third received power value, the third received power value being indicative of a third received power received from the second access terminal at the macro access point; and
receiving a first pilot strength measurement value, the first pilot strength measurement value being indicative of a fourth received power received from the macro access point at the second access terminal.

13. The method of claim 12, further comprising:
receiving a second pilot strength measurement value, the second pilot strength measurement value being indicative of a fifth received power received from a second private access point at the second access terminal; and if the second received power value is equal to the first received power value, determining that the first private access point comprises the second private access point.

14. The method of claim 13, wherein the first transmit power value, the third received power value, the first pilot strength measurement value, and the second pilot strength measurement value are sent from the macro access point to the private access point server.

15. The method of claim 13, wherein determining the second received power value comprises:

determining the second received power value using at least one of the first transmit power value, the third received power value, the first pilot strength measurement value, the second pilot strength measurement value, or a second transmit power value, the second transmit power being indicative of a second transmit power of the first private access point.

16. The method of claim 15, wherein determining the second received power value comprises:

multiplying the third received power value by a first ratio and a second ratio to produce the second received power value, the first ratio comprising the first pilot strength measurement value divided by the second pilot strength measurement value, and the second ratio comprising the first transmit power value divided by the second transmit power value.

17. A private access point, comprising:

a memory, the memory storing instructions for execution; and one or more processing devices configured to execute the instructions, the instructions for causing the one or more processing devices to:

transmit a beacon, by a first private access point, the beacon transmitted using a first pseudo-noise code, the first pseudo-noise code being different from an operating pseudo-noise code of the first private access point;

determine a first pathloss value at the private access point, the private access point in a wireless communication network, the first pathloss value being an estimate of a first pathloss between the first private access point and a first access terminal, wherein determining the first pathloss value comprises determining a first received power value at the first private access point, the first received power value being associated with the first access terminal;

send at least one of the first pathloss value or the first received power value to a private access point server, the private access point server being configured to:

receive a hand off message from a macro access point, the hand off message including the first pseudo-noise code that corresponding to several private access points including the first private access point, the macro access point being in communication with a second access terminal over a connection;

communicate with the one or more private access points;

determine, using the at least one of the first pathloss value or the first received power value, whether the first private access point is most likely of the one or more private access points to be a subject of the handoff message;

determine, based on at least one of the first pathloss value or the first received power value, whether the-first access terminal is within communication range of the first private access point; and respond to the hand off message substituting the operating pseudo-noise code for the first pseudo-noise code.

18. The private access point of claim 17, wherein the instructions comprise instructions for causing the one or more processing devices to:

in response to sending the at least one of the first pathloss value or the first received power value, and in response to the private access point server determining that the first private access point is the most likely to be the subject of the handoff message, communicate with the second access terminal over the connection, the connection being handed off from the macro access point to the first private access point.

19. One or more computer storage devices storing executable instructions, the one or more computer storage devices being tangible media, and the executable instructions for causing one or more processing devices to:

transmit a beacon, by a private access point, the beacon transmitted using a first pseudo-noise code, the first pseudo-noise code being different from an operating pseudo-noise code of the first private access point;

determine a first pathloss value at the private access point, the private access point in a wireless communication network, the first pathloss value being an estimate of a first pathloss between the first private access point and a first access terminal, wherein determining the first pathloss value comprises determining a first received power value at the first private access point, the first received power value being associated with the first access terminal; and send at least one of the first pathloss value or the first received power value to a private access point server, the private access point server being configured to:

receive a hand off message from a macro access point, the hand off message including the first pseudo-noise code that corresponding to several private access points including the first private access point, the macro access point being in communication with a second access terminal over a connection;

communicate with the one or more private access points;

determine, using the at least one of the first pathloss value or the first received power value, whether the first private access point is most likely of the several private access points to be a subject of handoff message;

determine, based on at least one of the first pathloss value or the first received power value, whether the first access terminal is within communication range of the first private access point; and respond to the hand off message substituting the operating pseudo-noise code for the first pseudo-noise code.

20. The one or more computer storage devices of claim 19, wherein the executable instructions comprise executable instructions for causing one or more processing devices to:

in response to sending the at least one of the first pathloss value or the first received power value, and in response to the private access point server determining that the first private access point is the most likely to be the subject of the handoff message, communicate with the second access terminal over the connection, the connection being handed off from the macro access point to the first private access point.

21. A method, comprising:
receiving a handoff message from a macro access point at a private access point server, the hand-off message including a first pseudo-noise-code, the private access point server being in communication with one or more private access points in a wireless communication network, the macro access point being in communication with a first access terminal over a connection, the macro access point sending the handoff message to the private access point server responsive to the first access terminal sending a first pilot strength measurement value to the macro access point, the first pilot strength measurement value being indicative of a first received power received from an unidentified private access point of the one or more private access points at the first access terminal, the handoff message comprising information about the unidentified private access point to assist the private access point server in identifying the unidentified private access point;
requesting one or more pathloss values from a subset of private access points of the one or more private access points, wherein for each private access point of the subset, a respective pathloss value of the one or more pathloss values is an estimate of a respective pathloss between the private access point and a respective access terminal in a vicinity of the private access point;
determining, using the one or more pathloss values, a selected private access point of the subset, the selected private access point being the most likely to comprise the unidentified private access point;
determining, using the respective pathloss value, that the first access terminal is within communication range of the selected private access point; and
sending a response to the handoff message that identifies the selected private access point to the macro access point so that the macro access point can attempt to handoff the connection to the selected private access point including substituting an operational pseudo-noise code of the selected private access point in place of the first pseudo-noise code;
wherein sending the response to the handoff message comprises sending a response to the handoff message if a first pathloss value of the one or more pathloss values exceeds a threshold, the first pathloss value being associated with the selected private access point.

22. The method of claim 21, wherein the handoff message comprises a handoff preparation request, the handoff preparation request comprising an IS-41 message.

23. The method of claim 22, wherein the IS-41 message comprises at least one of a FacDir2 message or a HandoffMeasurement Request2 message.

* * * * *

UNITED STATES PATENT AND TRADEMARK OFFICE
CERTIFICATE OF CORRECTION

PATENT NO. : 8,774,134 B2  
APPLICATION NO. : 12/343438  
DATED : July 8, 2014  
INVENTOR(S) : Balaji Raghothaman and Woojune Kim Page 1 of 1

It is certified that error appears in the above-identified patent and that said Letters Patent is hereby corrected as shown below:

In the Claims

Column 20, Line 1, In Claim 17, delete "the-first" and insert -- the first --, therefor.

Signed and Sealed this  
Seventh Day of October, 2014

Michelle K. Lee  
*Deputy Director of the United States Patent and Trademark Office*